(12) United States Patent
Lin et al.

(10) Patent No.: US 11,848,583 B2
(45) Date of Patent: Dec. 19, 2023

(54) CONSTANT CURRENT CHARGING DEVICE

(71) Applicant: Silicon Integrated Systems Corp., Hsinchu (TW)

(72) Inventors: Song-Sheng Lin, Hsinchu (TW); Keng-Nan Chen, Hsinchu (TW)

(*) Notice: Subject to any disclaimer, the term of this patent is extended or adjusted under 35 U.S.C. 154(b) by 337 days.

(21) Appl. No.: 17/205,002

(22) Filed: Mar. 18, 2021

(65) Prior Publication Data

US 2021/0305835 A1    Sep. 30, 2021

(30) Foreign Application Priority Data

Mar. 27, 2020 (TW) ................. 109110630

(51) Int. Cl.
*G05F 3/26* (2006.01)
*H02J 7/00* (2006.01)

(52) U.S. Cl.
CPC .......... *H02J 7/00714* (2020.01); *G05F 3/262* (2013.01)

(58) Field of Classification Search
CPC ............................ H02J 7/00714; G05F 3/262
See application file for complete search history.

(56) References Cited

U.S. PATENT DOCUMENTS

| 7,053,597 | B2 | 5/2006 | Lin |
| 8,339,108 | B2 | 12/2012 | Li |
| 2011/0279079 | A1 | 11/2011 | Do Valle et al. |
| 2017/0126026 | A1 | 5/2017 | Gerna et al. |
| 2017/0142786 | A1 | 5/2017 | Cai et al. |
| 2018/0253118 | A1 | 9/2018 | Sano et al. |

FOREIGN PATENT DOCUMENTS

| CN | 102545359 A | 7/2012 |
| CN | 103455067 A | 12/2013 |
| CN | 105048779 A | 11/2015 |
| CN | 110635541 A | 12/2019 |
| CN | 110768319 A | 2/2020 |
| TW | 200413879 A | 8/2004 |
| TW | 201015826 A | 4/2010 |

OTHER PUBLICATIONS

R. Jacob Baker "CMOS: Circuit Design, Layout, and Simulation, Third Ediiton"; Chapter 20: Current Mirrors; Copyright @ 2010. (Year: 2010).*
Bruce Carter et al. "Op Amps for Everyone" (Fifth Edition); Chapter 2—Development of the Ideal Op Amp Equations; pp. 7-19; 2018. (Year: 2018).*

* cited by examiner

*Primary Examiner* — Drew A Dunn
*Assistant Examiner* — Pamela J Jeppson
(74) *Attorney, Agent, or Firm* — Mark M. Friedman

(57) ABSTRACT

A constant current charging device is configured to charge a device to be charged and includes: a reference current source configured to provide a reference current; a current mirror electrically coupled to the reference current source and configured to output a mirror current; a current adjusting unit electrically coupled to the current mirror and the device to be charged and configured to output a charging current according to the mirror current to charge the device to be charged; and a current compensation unit electrically coupled to the current mirror and the current adjusting unit and configured to adjust the charging current according to a reference voltage.

5 Claims, 2 Drawing Sheets

CONSTANT CURRENT CHARGING DEVICE

TECHNICAL FIELD OF DISCLOSURE

The present disclosure relates to the field of charging technologies, and more particularly to a constant current charging device.

BACKGROUND OF DISCLOSURE

A conventional charging device includes a constant current charging mode and a constant voltage charging mode. At the beginning of charging a battery, the charging device charges the battery in the constant current charging mode. When the battery is charged to a predetermined voltage, the charging device charges the battery in the constant voltage charging mode.

However, a current and a voltage provided by the conventional charging device are unstable. The unstable current or the unstable voltage not only affects charging efficiency of the battery but also decreases service life of the battery.

Therefore, there is a need to solve the above-mentioned problem in the prior art.

SUMMARY OF DISCLOSURE

An objective of the present disclosure is to provide a constant current charging device capable of solving the problem in the prior art.

The constant current charging device of the present disclosure includes: a reference current source configured to provide a reference current; a current mirror electrically coupled to the reference current source and configured to output a mirror current; a current adjusting unit electrically coupled to the current mirror and the device to be charged and configured to output a charging current according to the mirror current to charge the device to be charged; and a current compensation unit electrically coupled to the current mirror and the current adjusting unit and configured to adjust the charging current according to a reference voltage.

The constant current charging device of the present disclosure can provide, by the current adjusting unit and the current compensation unit, the charging current which has a high current value and is controllable. Furthermore, the constant current charging device of the present disclosure can design the charging current according to channel width/length ratios of transistors of the current mirror and channel width/length ratios of transistors of the current adjusting unit. Finally, the constant current charging device of the present disclosure can provide, by the current compensation unit, the charging current and the charging voltage which are stable.

DETAILED DESCRIPTION OF DISCLOSURE

To make the objectives, technical schemes, and technical effects of the present disclosure more clearly and definitely, the present disclosure will be described in detail below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
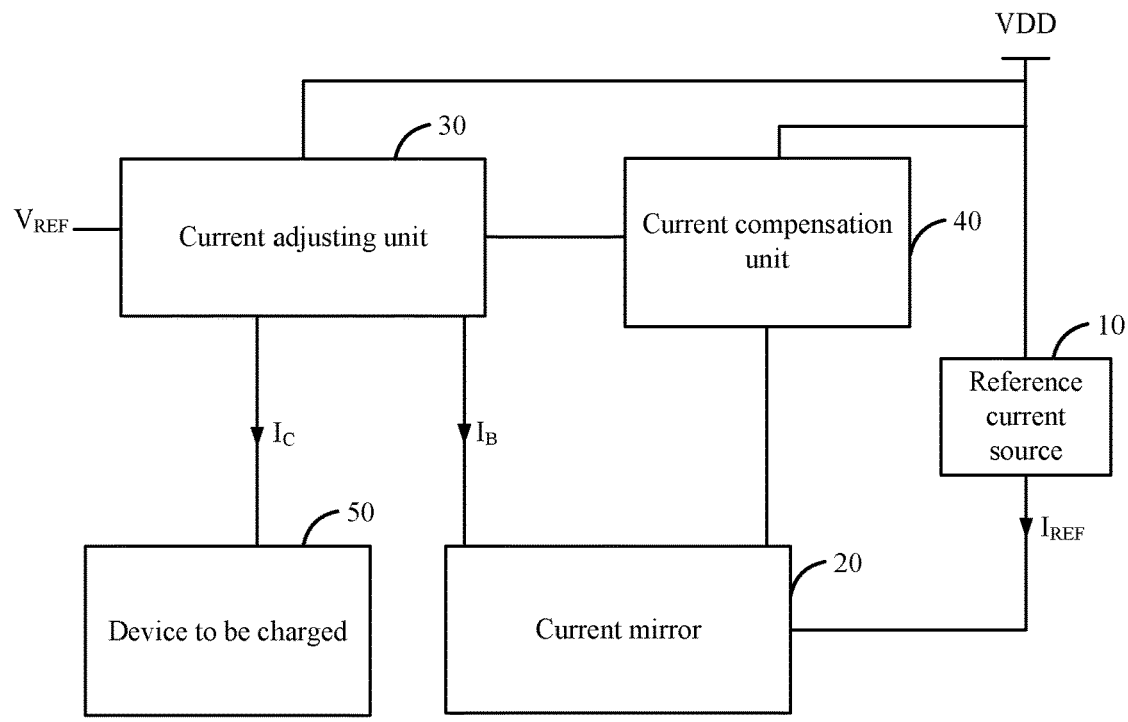
FIG. 1 illustrates a block diagram of a constant current charging device in accordance with an embodiment of the present disclosure.
Figure 2:
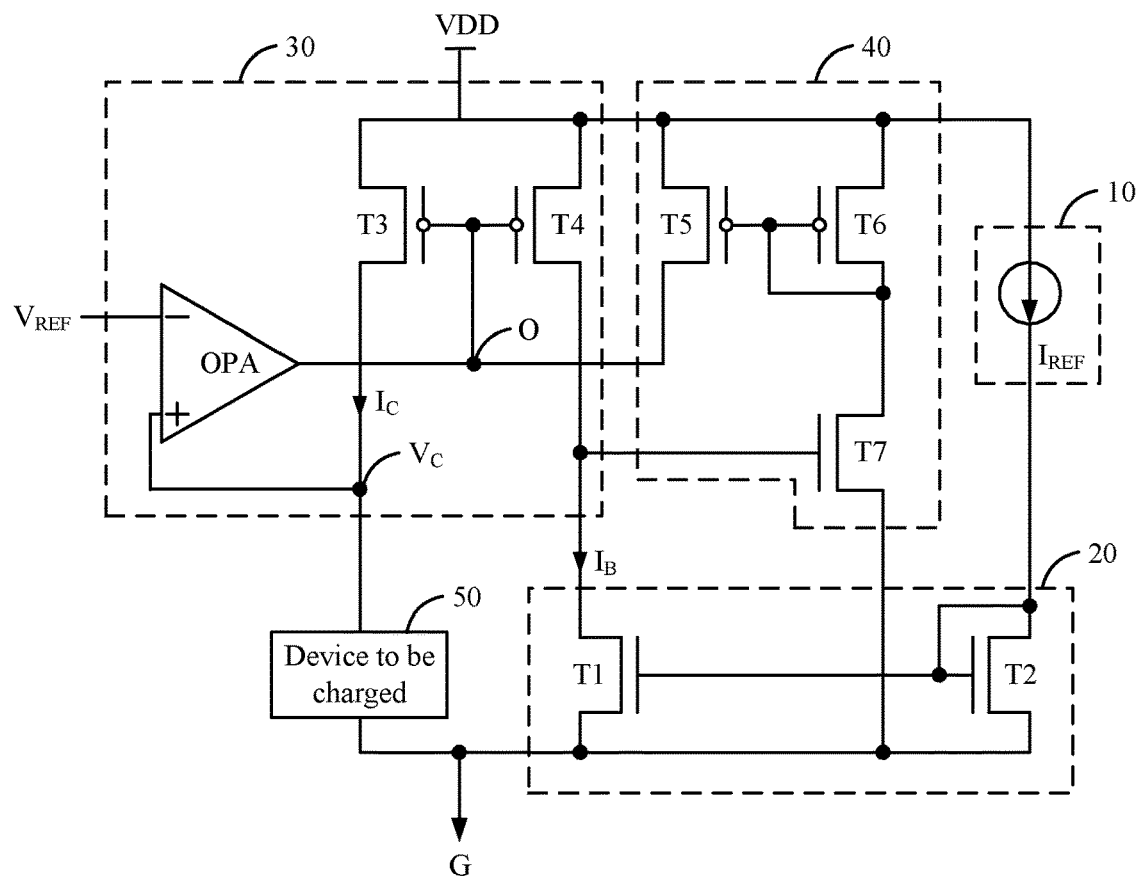
FIG. 2 illustrates a detailed circuit diagram of the constant current charging device in FIG. 1.

Please refer to FIG. 1 and FIG. 2. FIG. 1 illustrates a block diagram of a constant current charging device in accordance with an embodiment of the present disclosure. FIG. 2 illustrates a detailed circuit diagram of the constant current charging device in FIG. 1.

The constant current charging device is configured to charge a device 50 to be charged and includes a reference current source 10, a current mirror 20, a current adjusting unit 30, and a current compensation unit 40.

The device 50 to be charged of the present disclosure may be but not limited to a circuit required to be charged or a rechargeable battery.

The reference current source 10 is electrically coupled to a power source VDD and configured to provide a reference current $I_{REF}$. The power source VDD may be a direct-current power source. The reference current $I_{REF}$ can be adjusted according to requirements.

The current mirror 20 is electrically coupled to the reference current source 10 and configured to output a mirror current $I_B$. The mirror current $I_B$ can be M times of the reference current $I_{REF}$.

The current adjusting unit 30 is electrically coupled to the power source VDD, the current mirror 20, and the device 50 to be charged. The current adjusting unit 30 is configured to output a charging current $I_C$ according to the mirror current $I_B$ to charge the device 50 to be charged. The charging current $I_C$ is N times of the mirror current $I_B$. That is, the charging current $I_C$ can be M×N times of the reference current $I_{REF}$. M and N are positive integers.

The current compensation unit 40 is electrically coupled to the power source VDD, the current mirror 20, and the current adjusting unit 30. The current compensation unit 40 is configured to compensate (adjust) the charging current $I_C$ according to a reference voltage $V_{REF}$. In detail, the current compensation unit 40 can control to increase or decrease the charging current $I_C$. The current compensation unit 40 is further configured to adjust a charging voltage $V_C$ inputted to the device 50 to be charged. In detail, the current compensation unit 40 can control to increase or decrease the charging voltage $V_C$. The reference voltage $V_{REF}$ can be adjusted according to requirements.

As shown in FIG. 2, the current mirror includes a first transistor T1 and a second transistor T2. The first transistor T1 includes a first control terminal, a first input terminal, and a first output terminal. The second transistor T2 includes a second control terminal, a second input terminal, and a second output terminal.

The first control terminal is electrically coupled to the reference current source 10 and the second control terminal. The first input terminal is electrically coupled to the current adjusting unit 30 and the current compensation unit 40. The first output terminal is electrically coupled to a ground G. The second input terminal is electrically coupled to the reference current source 10. The second output terminal is electrically coupled to the ground G.

In the present embodiment, the first transistor T1 and the second transistor T2 may be N-type Metal-Oxide-Semiconductor Field-Effect Transistor (NMOSFET).

The current adjusting unit includes an operational amplifier OPA, a third transistor T3, and a fourth transistor T4. The operational amplifier includes an inverting input −, a non-inverting input +, and an output O. The third transistor T3 includes a third control terminal, a third input terminal, and a third output terminal. The fourth transistor includes a fourth control terminal, a fourth input terminal, and a fourth output terminal.

The inverting input − is electrically coupled to the reference voltage $V_{REF}$. The non-inverting input + is electrically coupled to the device 50 to be charged and the third output terminal. The output O is electrically coupled to the current compensation unit 40. The third control terminal is electrically coupled to the fourth control terminal and the current compensation unit 40. The third input terminal is electrically coupled to the power source VDD. The fourth input terminal is electrically coupled to the power source VDD. The fourth output terminal is electrically coupled to the first input terminal.

In the present embodiment, the third transistor T3 and the fourth transistor T4 may be P-type Metal-Oxide-Semiconductor Field-Effect Transistor (PMOSFET).

The current compensation unit includes a fifth transistor T5, a sixth transistor T6, and a seventh transistor T7. The fifth transistor T5 includes a fifth control terminal, a fifth input terminal, and a fifth output terminal. The sixth transistor T6 includes a sixth control terminal, a sixth input terminal, and a sixth output terminal. The seventh transistor T7 includes a seventh control terminal, a seventh input terminal, and a seventh output terminal.

The fifth control terminal is electrically coupled to the sixth control terminal, the sixth output terminal, and the seventh input terminal. The fifth input terminal is electrically coupled to the power source VDD. The fifth output terminal is electrically coupled to the third control terminal. The sixth input terminal is electrically coupled to the power source VDD. The seventh control terminal is electrically coupled to the first input terminal. The seventh output terminal is electrically coupled to the ground G.

In the present embodiment, the fifth transistor T5 and the sixth transistor T6 may be PMOSFET, and the seventh transistor T7 may be an NMOSFET.

An operating principle of the constant current charging device of the present disclosure will be described in detail as follows.

First, the charging voltage $V_C$ is zero in an initial state. A voltage (equal to zero) of the non-inverting input + is smaller than the reference voltage $V_{REF}$. The output O outputs a low voltage level. The third transistor T3 and the fourth transistor T4 are turned on, and thus the seventh transistor T7 is turned on. When the seventh transistor T7 is turned on, the fifth transistor T5 and the sixth transistor T6 are turned on. A current flowing through the fifth transistor T5 affects a voltage of the first control terminal and a voltage of the second control terminal, thereby affecting the mirror current $I_B$ and the charging current $I_C$.

In detail, the mirror current $I_B$ relates to a channel width/length ratio (W1/L1) of the first transistor T1 and a channel width/length ratio (W2/L2) of the second transistor T2. M is a ratio of the channel width/length ratio (W1/L1) of the first transistor T1 to the channel width/length ratio (W2/L2) of the second transistor T2. W1 is a channel width of the first transistor T1, and L1 is a channel length of the first transistor T1. W2 is a channel width of the second transistor T2, and L2 is a channel length of the second transistor T2. A relationship between the mirror current $I_B$ and the reference current $T_{REF}$:

$$I_B = M \times I_{REF} = (W1/L1)/(W2/L2) \times I_{REF}.$$

The charging current $I_C$ relates to a channel width/length ratio (W3/L3) of the third transistor T3 and a channel width/length ratio (W4/L4) of the fourth transistor T4. N is a ratio of the channel width/length ratio (W3/L3) of the third transistor T3 to the channel width/length ratio (W4/L4) of the fourth transistor T4. W3 is a channel width of the third transistor T3, and L3 is a channel length of the third transistor T3. W4 is a channel width of the fourth transistor T4, and L4 is a channel length of the fourth transistor T4. A relationship between the charging current $I_C$ and the mirror current $I_B$:

$$I_C = N \times I_B = N \times M \times I_{REF} = (W3/L3)/(W4/L4) \times (W1/L1)/(W2/L2) \times I_{REF}.$$

It can be understood from the above that the constant current charging device of the present disclosure can design the channel width/length ratio (W1/L1) of the first transistor T1, the channel width/length ratio (W2/L2) of the second transistor T2, the channel width/length ratio (W3/L3) of the third transistor T3, and the channel width/length ratio (W4/L4) of the fourth transistor T4 to provide the charging current $I_C$ which is stable. Accordingly, the charging current $I_C$ can be designed to have a high current value and to be controllable.

When the charging voltage $V_C$ is increased to be close to the reference voltage $V_{REF}$, the output O outputs a high voltage level to decrease a current flowing through the fourth transistor T4. When the current flowing through the fourth transistor T4 is decreased, and then the mirror current $I_B$ and the charging current $I_C$ are decreased we well.

When the charging voltage $V_C$ is increased to the reference voltage $V_{REF}$, the first transistor T1 stops providing the charging current $I_C$. That is, when the charging voltage $V_C$ is equal to the reference voltage $V_{REF}$, the charging current $I_C$ is zero.

In summary, the constant current charging device of the present disclosure can control to increase or decrease the charging current $I_C$ and control to increase or decrease the charging voltage $V_C$ by the current compensation unit 40, thereby providing the charging current $I_C$ and the charging voltage $V_C$ which are stable. Furthermore, the constant current charging device of the present disclosure can provide, by the current mirror 20 and the current adjusting unit 30, the charging current $I_C$ which has a high current value and is controllable.

Figure 3:
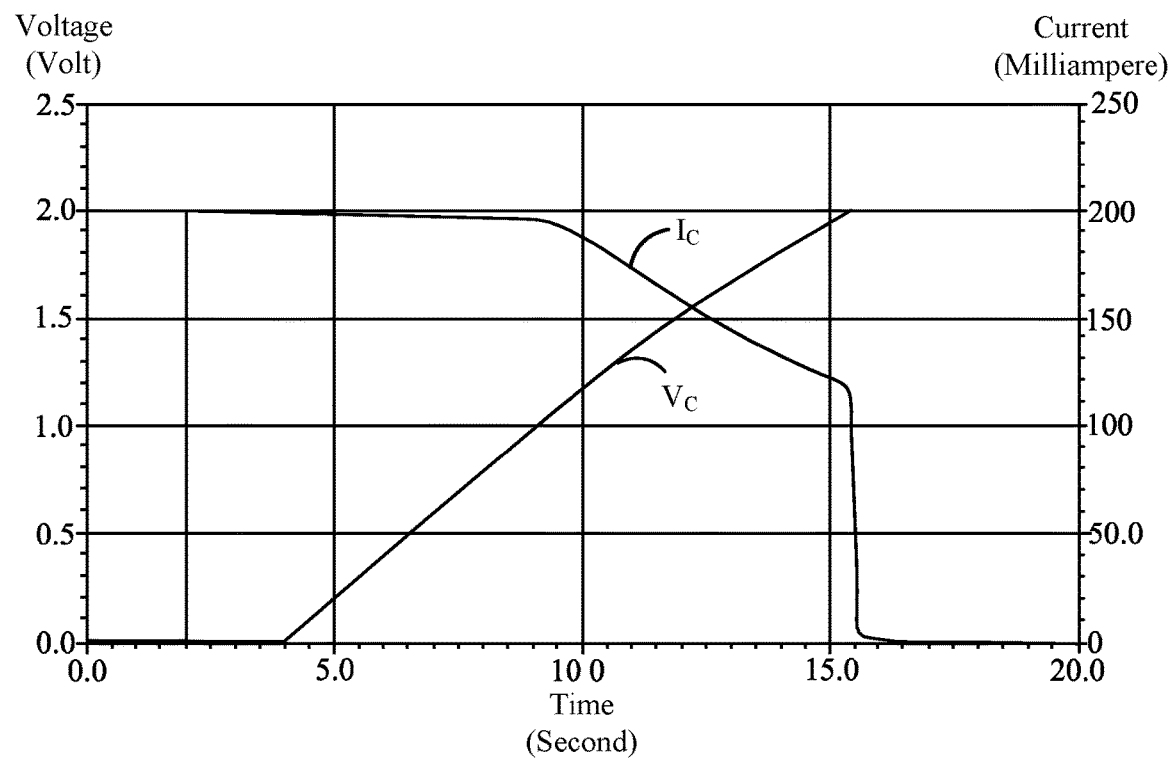
FIG. 3 illustrates a simulation diagram of a charging current $I_C$ and a charging voltage $V_C$ in FIG. 2.

Please refer to FIG. 3. FIG. 3 illustrates a simulation diagram of the charging current $I_C$ and the charging voltage $V_C$ in FIG. 2.

In the simulation diagram of FIG. 3, the power source VDD is 4 volts, the reference voltage $V_{REF}$ is 2 volts, the reference current $I_{RFF}$ is 100 microamperes, the charging current $I_C$ is 200 milliamperes, and the device 50 to be charged is a one farad capacitor.

It can be understood from FIG. 3 that the charging current $I_C$ can rapidly provide a stable current of 200 milliamperes at about 2 seconds. When the charging voltage $V_C$ is raised gradually, the charging current $I_C$ is decreased gradually. When the charging voltage $V_C$ is raised to the reference voltage $V_{REF}$ (2 volts), the charging current $I_C$ is decreased to zero rapidly.

Figure 4:
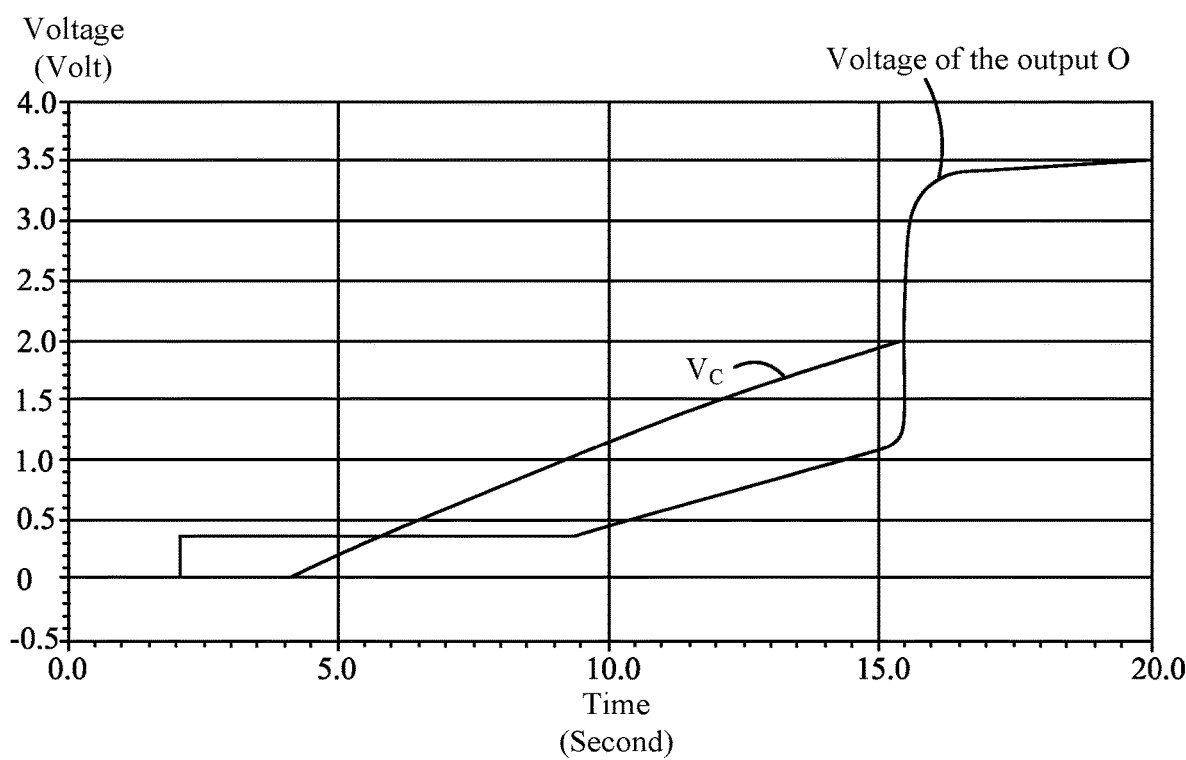
FIG. 4 illustrates a simulation diagram of the charging voltage $V_C$ and a voltage of an output O in FIG. 2.

Please refer to FIG. 4. FIG. 4 illustrates a simulation diagram of the charging voltage $V_C$ and a voltage of the output O in FIG. 2.

It can be understood from FIG. 4 that the output voltage of the output O (equal to a voltage of the control terminal of the first transistor T1 and a voltage of the control terminal of the second transistor T2) is zero in the initial state. When the voltage of the output O is raised, the charging voltage $V_C$ is raised stably as well. When the charging voltage $V_C$ is raised to the reference voltage $V_{REF}$ (2 volts), the voltage of the output O is at a high voltage level. The first transistor T1 and the second transistor T2 are not turned on, and the charging current $I_C$ is zero.

The constant current charging device of the present disclosure can provide, by the current adjusting unit and the current compensation unit, the charging current (as shown in FIG. 3) which has a high current value and is controllable. Furthermore, the constant current charging device of the present disclosure can design the charging current according to the channel width/length ratios of the transistors of the current mirror and the channel width/length ratios of the transistors of the current adjusting unit. Finally, the constant current charging device of the present disclosure can provide, by the current compensation unit, the charging current (as show in FIG. 3) and the charging voltage (as show in FIG. 4) which are stable.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A constant current charging device, configured to charge a device to be charged, and the constant current charging device comprising:
   a reference current source configured to provide a reference current;
   a current mirror electrically coupled to the reference current source and configured to output a mirror current, wherein the mirror current is M times of the reference current, M is a positive integer, and the current mirror comprises a first transistor comprising a first control terminal, a first input terminal, and a first output terminal, and a second transistor comprising a second control terminal, a second input terminal, and a second output terminal;
   a current adjusting unit electrically coupled to the current mirror and the device to be charged and configured to output a charging current according to the mirror current to charge the device to be charged, wherein the charging current is N times of the mirror current, N is a positive integer, and the current adjusting unit comprises:
      an operational amplifier comprising an inverting input, a non-inverting input, and an output;
      a third transistor comprising a third control terminal, a third input terminal, and a third output terminal; and
      a fourth transistor comprising a fourth control terminal, a fourth input terminal, and a fourth output terminal; and
   a current compensation unit electrically coupled to the current mirror and the current adjusting unit and configured to adjust the charging current according to a reference voltage, wherein the current compensation unit comprises:
      a fifth transistor comprising a fifth control terminal, a fifth input terminal, and a fifth output terminal;
      a sixth transistor comprising a sixth control terminal, a sixth input terminal, and a sixth output terminal; and
      a seventh transistor comprising a seventh control terminal, a seventh input terminal, and a seventh output terminal;
   wherein the first control terminal is electrically coupled to the reference current source and the second control terminal, the first input terminal is electrically coupled to the current adjusting unit and the current compensation unit, the first output terminal is electrically coupled to a ground, the second input terminal is electrically coupled to the reference current source, and the second output terminal is electrically coupled to the ground;
   wherein the inverting input is electrically coupled to the reference voltage, the non-inverting input is electrically coupled to the device to be charged and the third output terminal, the output is electrically coupled to the current compensation unit, the third control terminal is electrically coupled to the fourth control terminal and the current compensation unit, the third input terminal is electrically coupled to a power source, the fourth input terminal is electrically coupled to the power source, and the fourth output terminal is electrically coupled to the first input terminal;
   wherein the fifth control terminal is electrically coupled to the sixth control terminal, the sixth output terminal, and the seventh input terminal, the fifth input terminal is electrically coupled to the power source, the fifth output terminal is electrically coupled to the third control terminal, the sixth input terminal is electrically coupled to the power source, the seventh control terminal is electrically coupled to the first input terminal, and the seventh output terminal is electrically coupled to the ground.

2. The constant current charging device according to claim 1, wherein M is a ratio of a channel width/length ratio of the first transistor to a channel width/length ratio of the second transistor.

3. The constant current charging device according to claim 1, wherein N is a ratio of a channel width/length ratio of the third transistor to a channel width/length ratio of the fourth transistor.

4. The constant current charging device according to claim 1, wherein the current compensation unit is further configured to adjust a charging voltage of the device to be charged.

5. The constant current charging device according to claim 4, wherein when the charging voltage is equal to the reference voltage, the charging current is zero.

* * * * *